Feb. 7, 1950     M. SCHWARTZ     2,496,680
PHOTOFLASH LAMP SOCKET WITH TEST LAMP
Filed Oct. 28, 1947     2 Sheets-Sheet 1
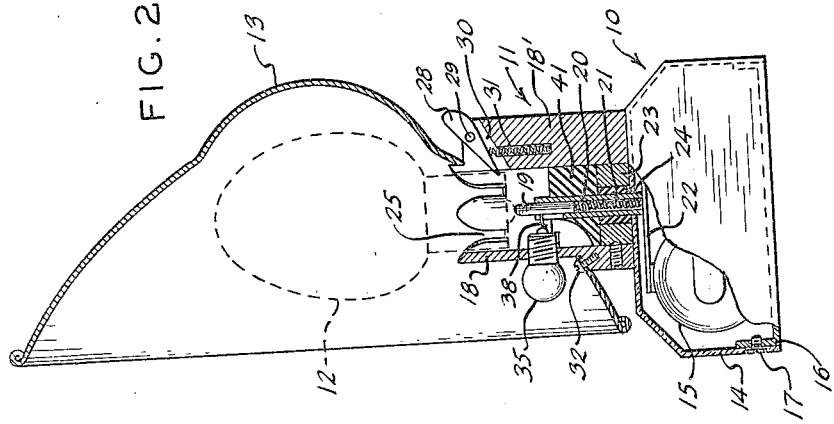
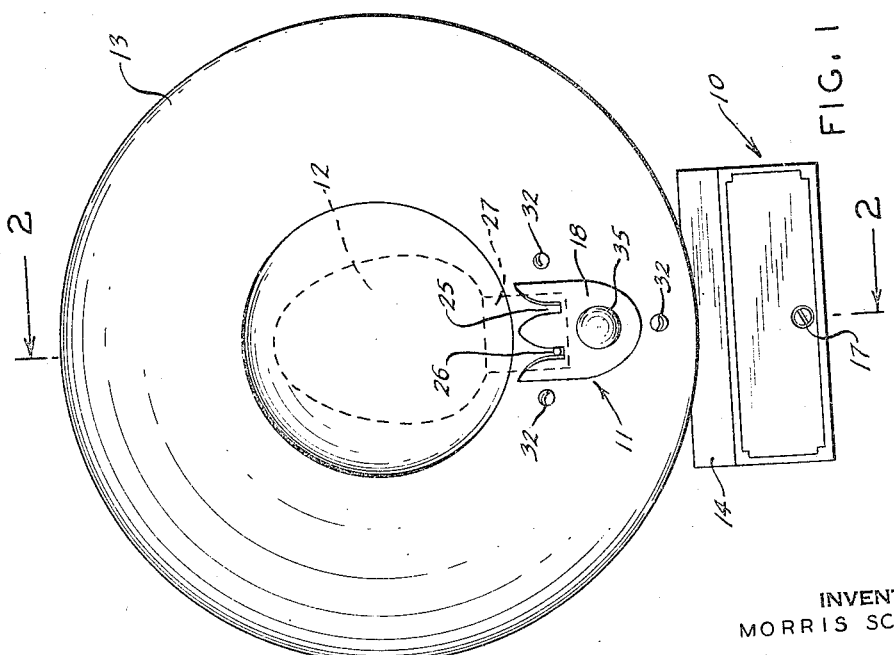
INVENTOR
MORRIS SCHWARTZ
BY
Frederick E. Hane
ATTORNEY Feb. 7, 1950

M. SCHWARTZ 2,496,680

PHOTOFLASH LAMP SOCKET WITH TEST LAMP

Filed Oct. 28, 1947

INVENTOR
MORRIS SCHWARTZ
BY Frederick E. Hane
ATTORNEY

Patented Feb. 7, 1950

2,496,680

UNITED STATES PATENT OFFICE 2,496,680

PHOTOFLASH LAMP SOCKET WITH TEST LAMP

Morris Schwartz, Stamford, Conn., assignor to The Kalart Company Inc., Stamford, Conn.

Application October 28, 1947, Serial No. 782,583

10 Claims. (Cl. 67—31)

1

This invention relates to a socket for lamps or bulbs as are used in photographic flashwork, particularly to sockets of the type equipped with an ejector for the ejection of a fired bulb.

Sockets of the general type, above referred to, serve to connect an inserted flash lamp to a circuit including a source of current such as a battery, a generator or charged capacitors which circuit will be closed when a release button actuating the camera shutter and the synchronizer, if any, is operated, thereby causing the photoflash lamp to be fired. In certain instances, it can and does happen that the circuit connection between socket and source of current is accidentally closed, for instance in case of faulty wiring or a defective release button or socket. As a result, the flash lamp when inserted in the socket lamp will be instantly fired. Such unintentional firing of the lamp may cause injury to the operator aside from the waste of a lamp and the possible loss of a picture.

It is already known to provide a test or pilot lamp for testing the lamp circuit. Such test lamp, usually a lamp of the type used in conventional flash lights, is inserted in an opening of the socket shell whenever it is desired to test the flash lamp circuit and the condition of the source of current. It must be removed before insertion of a flash lamp. Hence, the use of such test lamp does not fully protect the operator against accidental firing of the flash lamp as the defect in the circuit may develop after the last test. Furthermore, the insertion and removal of a test lamp require additional manipulations by the operator that are sometimes inconvenient.

One object of the invention is to provide means permitting the operator to detect easily a fault in the circuit system of the flash lamp and the synchronizer.

Another object of the invention is the provision of means fully protecting the operator against accidental firing of a flash lamp upon insertion into the socket.

Another object of the invention is to provide test means permitting the operator to test the conditions of the circuit system and the source of current without requiring the insertion or removal of any part such as a test lamp.

Another object of the invention is the provision of test means which are in permanent readiness for testing the conditions of the lamp circuit and the source of current and which are actuated by operating the camera release button.

Generally speaking, the invention resides in permanently mounting a test or pilot lamp in

2 the flash lamp socket so that the test lamp terminals are connected to the terminals of the socket if and when no flash lamp is inserted in the socket, the test lamp being positioned in such manner that a flash lamp can be inserted while leaving the test lamp in the socket. The contact elements in the socket are so constructed that a flash lamp, upon insertion, will disconnect the test lamp which will be automatically reconnected when the flash lamp is removed. As a result, the condition of the circuit system and the source of current can be tested at any time before insertion of a flash lamp by simply actuating the camera release button which will cause the test lamp to burn. The test lamp will also be lighted when there is a short circuit in the circuit.

It should be noted in this connection that it is also possible and quite practical in certain instances to mount the test lamp separately from the flash lamp socket and to associate switch contacts with the shell which normally connect the test lamp to the source of current and automatically disconnect the test lamp upon insertion of a flash lamp in the flash lamp socket.

Other and further objects, features and advantages of the invention will be pointed out hereinafter and set forth in the appended claims forming part of the application.

In the accompanying drawings several now preferred embodiments of the invention are shown by way of illustration and not by way of limitation.

In the drawings:

Fig. 1 is an elevational front view of a flash lamp unit equipped with a test lamp arrangement according to the invention.

Fig. 2 is a section along line 2—2 of Fig. 1.

Figure 8:
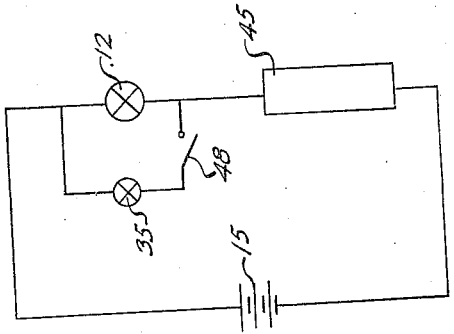
Fig. 8 is a typical circuit system for a flash unit with a test lamp arrangement according to the invention.

Referring now to Figs. 1 to 5 in detail, these figures show a self-contained flash lamp unit comprising a battery case, generally designated by 10, a socket, generally designated by 11, receiving a flash lamp 12 and mounted on battery case 10, and a reflector, generally designated by 13, supported by socket 11. The flash lamp unit can be connected by a connecting cord in circuit with a synchronizer, a camera release button, and in case of an electromagnetically operated shutter with the shutter solenoid. The circuit connections of the flash lamp unit, to the extent as they are necessary for the understanding of the invention, will be more fully explained hereinafter in connection with Fig. 8.

Battery case 10 comprises a case 14 made of plastic or any other suitable material. The case houses the source of current such as conventional batteries 15. A cover 16 fastened to case 14 by any suitable means such as a screw 17 serves to close the battery case and to secure the batteries in their positions therein.

Socket 11 mounted on the flat top wall of case 10 is shown as being equipped with a lamp ejector and is suitable for receiving flash lamps having a threaded base or a smooth base either with or without locking pins. The socket comprises a metal shell 18 fastened to case 10 by any suitable means. This shell serves as one of the socket terminals and is connected for this purpose in circuit with the batteries. The second terminal of the socket is constituted by a contact pin 19 slidable within a metal sleeve 20 which in turn is fastened to the top wall of battery case 10. A spring 21 within sleeve 20 biases contact pin 19 to protrude from sleeve 20. Conventional means such as a collar (not shown) must of course be provided to prevent pin 19 from being pressed out of sleeve 20. The lower closed end of sleeve 20 is connected by a contact spring 22 or other suitable means with one of the terminals of the batteries. Sleeve 20 is further secured in its position within the shell and upon the battery case by means of an inserted metal ring 23 and an insulation ring 24. The receiving end of shell 18 is provided with a plurality of deep spaced notches 25 rounded off at their upper ends to form tulip-shaped portions. These notches serve to receive the locking pins 26 of a flash lamp 12 having a smooth base 27 in practically any position of locking pins 26 relative to shell 18. The purpose of notches 25 is to avoid the necessity of inserting the flash lamp in a definite position relative to the socket shell as is the case when bayonet slots are employed to secure a flash lamp in the socket by means of the locking pins engaging the bayonet slots.

Figure 3:
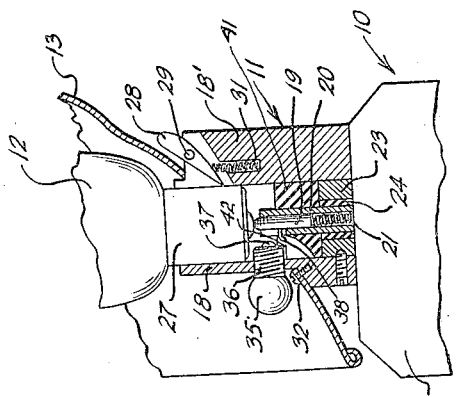
Fig. 3 is a sectional view similar to Fig. 2 showing the flash lamp unit with an inserted flash lamp.
Figure 4:
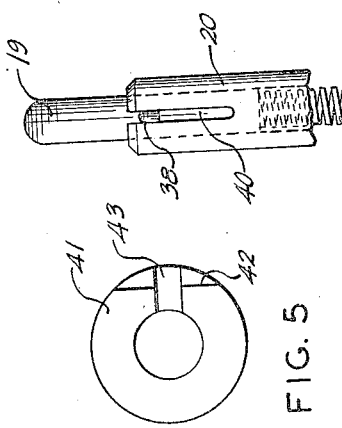
Figs. 4 and 5 show parts of the flash lamp unit on an enlarged scale.
Figure 5:
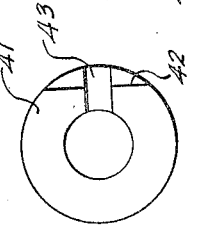

The lamp ejecting means as shown in Figs. 2 and 3 comprise, in addition to the spring actuated contact pin 19, a two-armed lever 28 pivotally supported by a pivot 29 in an axial elongated slot 30 of an enlarged shell portion 18'. Lever 28 extends with one end just into shell 18. The end of the lever extending into the shell has a sharp edge preferably made of tempered steel, in any event made of a material harder than the brass base 27 of flash lamp 12. A spring 31 inserted in a deep hole of shell section 18' tends to turn lever 28 in a clockwise direction, or in other words, against the direction of the insertion of a flash lamp.

Reflector 13 is fastened to a shoulder of shell 18 by means of three screws 32 and is of course so shaped and positioned that an inserted flash lamp is in proper position relative to the reflector.

Let it now be assumed that a flash lamp 12 is inserted in the socket, then the base of the flash lamp will pivot lever 28 against the action of spring 31 and the bottom terminal of the flash lamp will engage contact pin 19 and depress the same thereby loading spring 21. After the lamp is fully inserted and released, loaded spring 21 will urge the flash lamp upwardly thereby causing the sharp edge of lever 28 to bite into base 27 thus securing the flash lamp in the socket. When it is desired to eject the flash lamp, lever 28 is slightly pivoted in a counterclockwise direction. The sharp edge of the lever is thus released from the lamp base and loaded spring 21 will eject the lamp.

Flash lamp sockets and ejecting means as previously referred to are more fully described in the co-pending application Ser. No. 597,366, filed June 2, 1945, by Morris Schwartz and William Castedello.

The test lamp arrangement according to the invention shall now be described in detail:

A suitable small bulb, such as a conventional flash light bulb 35 is inserted with its base 36 in the wall of shell 18 thereby establishing an electric connection between the base terminal of bulb 35 and socket shell 18. The second or bottom terminal 37 of the bulb is arranged to be electrically connected with pin 19 constituting the second terminal of the flash lamp socket by means of a contact nose 38 fastened to pin 19 and extended therefrom. This nose may consist of a short piece of any suitable material such as flexible metal wire. The relative position of lamp 35 and contact nose 38 are so selected that nose 38 engages lamp terminal 37 when no flash lamp is inserted in the socket and pin 19 is in its uppermost position as can best be seen in Fig. 2.

As will be apparent, the filament of lamp 35 closes a circuit through the terminals of socket 11. When now a flash lamp is inserted in the socket, contact pin 19 is depressed so that contact nose 38 is disengaged from bulb terminal 37. As a result, bulb 35 is disconnected while flash lamp 12 is connected through the socket terminals. As soon as the flash lamp is ejected from the socket, bulb 35 is automatically reconnected.

To permit a depression of pin 19 relative to sleeve 20, an axial slot 40 is provided in the sleeve which serves to receive contact nose 38. To facilitate an insertion of bulb 35 in the correct position in which terminal 37 engages contact nose 38, an insulation ring 41 is inserted in sleeve 18. This ring has a shoulder 42 against which the base of lamp 35 abuts when correctly inserted. A slot 43 permits passage of contact nose 38.

Referring now to the circuit diagram of Fig. 8, this diagram shows a circuit connecting the battery 15 and the lamps 12 and 35 with a synchronizer 45 (indicated by a rectangle). Switch 48 is intended to represent the connection between bulb terminal 37 and contact pin 19 by means of contact nose 38.

As will be apparent from the previous description, switch 48, when closed, connects the test bulb 35 in the circuit as long as no flash lamp 12 is inserted in socket 11. As a result, the circuit is continuously ready for testing by simply actuating synchronizer 45. Furthermore, the test lamp will indicate a short circuit or other fault in the circuit by being illuminated, thereby warning the operator against insertion of a flash lamp in socket 11.

If the operator finds the circuit in good condition and inserts a flash lamp, the test lamp will be automatically disconnected at switch 48, thereby avoiding an unnecessary drain on the battery when the flash lamp is fired. When the test lamp is continuously burning, the operator is warned against inserting a flash lamp since the same will be immediately fired with resulting possible injury to the operator.

Figure 6:
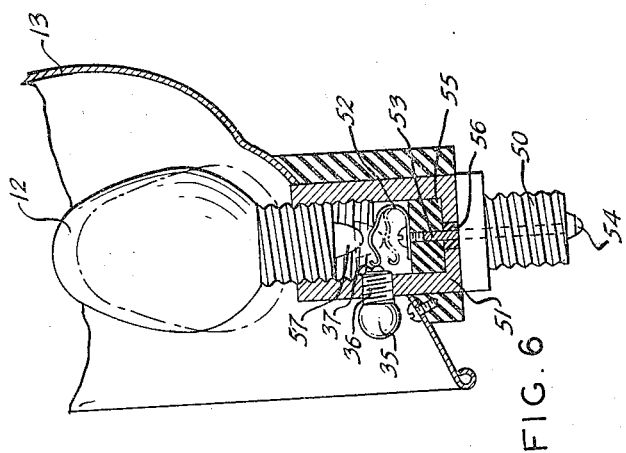
Fig. 6 is a sectional view of a modification of a flash lamp unit with a test lamp arrangement according to the invention.

Fig. 6 shows a flash lamp socket without ejector. The illustrated socket is of the type designed to be screwed into the head of a battery case by means of a threaded base or neck 50. The socket comprises a shell 51 connected with one of the terminals of the batteries in the battery case (not shown) and a contact spring 52 constituting the second terminal of the socket. Spring 52 is connected by a wire or rod 53 to the bottom terminal 54 of base 50. Contact spring 52 and wire 53 are insulated from shell 51 by insulation rings 55 and 56. Base 36 of the test lamp 35 is against supported by shell 51 so that terminal 37 of the test lamp 35 extends into the shell. Contact spring 52 is so shaped and positioned that it engages bulb terminal 37 when no flash lamp 12 is inserted in the socket. As soon as a flash lamp is threaded into the socket, terminal 57 at the bottom of the flash lamp base 36 will depress contact spring 52 into the position shown in dotted lines. As a result, the test lamp 35 is disconnected while the flash lamp is now connected to the socket terminals.

The flash lamp is shown in Fig. 6 as being of the threaded base type but it should be understood that a lamp having a smooth base and secured by means of a bayonet lock may also be employed. Furthermore, the spring contact shown in Figs. 2 and 3 may be employed in the embodiment of Fig. 6 and vice versa.

Figure 7:
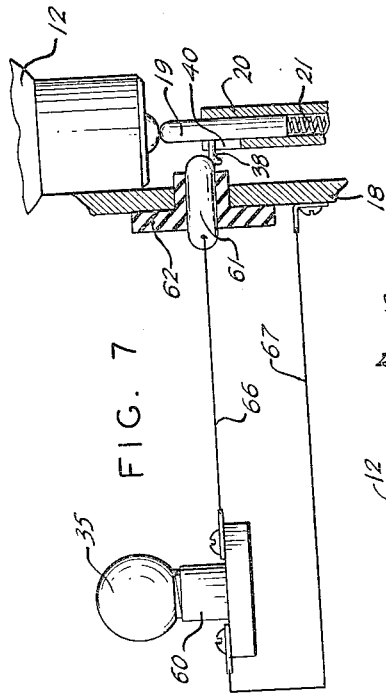
Fig. 7 is a fractional sectional view of another modification of the invention showing the test lamp physically separated from the flash lamp socket.

Fig. 7 shows an embodiment of the invention in which the test lamp 35 is separated from the flash lamp socket. The test lamp is being shown as supported by a separate socket 60. However, it should be understood that the test lamp can be mounted in any suitable position physically separated from the flash lamp socket. In particular, the test lamp may be mounted in a camera casing and observed through a window in the casing. The embodiment of Fig. 7 will be easily understandable from the previous description. The only essential difference is that a contact element 61 is inserted in socket shell 18 insulated therefrom by an insulation collar 62. Contact element 61 corresponds in its function to terminal 37 of test lamp 35. It is normally engaged by contact nose 38 and disengaged therefrom upon insertion of flash lamp 12. One of the test lamp terminals is connected to contact element 61 by a lead 66 and the other to shell 18 by a lead 67.

It will be apparent that switch 48 of Fig. 8 is represented in function by contact elements 38 and 61 of Fig. 7.

While the invention has been described in detail with respect to certain now preferred examples and embodiments of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A photoflash arrangement including a socket having a shell arranged to receive the base of a photoflash lamp and circuit means for connecting the socket terminals to a source of current, in combination with contact means arranged to be engaged by a test lamp and to connect the test lamp terminals in a by-pass circuit with said circuit means, and switch means included in the test lamp circuit and biased into a position maintaining the test lamp circuit closed, said switch means being mounted within said shell and arranged to be engaged by an inserted flash lamp base and to be moved into a position disconnecting the test lamp.

2. A socket for photoflash lamps in combination with contact means arranged to receive a test lamp and to connect the test lamp terminals with the socket terminals, said contact means being constructed and positioned to permit the simultaneous insertion of a flash lamp and a test lamp in the socket, the contact means including two contact members, one of them movable, the movable contact member being constructed and positioned to be engaged by an inserted flash lamp and to be moved into a portion disconnected from the test lamp upon insertion of a flash lamp.

3. A socket for photoflash lamps in combination with contact means supported on the socket and arranged to receive a test lamp and to connect the test lamp terminals with the socket terminals, said contact means being constructed and positioned to permit the simultaneous insertion of a flash lamp and test lamp in the socket, said contact means including two contact members, one of them movable the other being constituted by the socket shell, the movable contact member being constructed and positioned to be engaged by an inserted flash lamp and to be movable into a position disconnected from the test lamp upon insertion of a flash lamp.

4. A socket for photoflash lamps in combination with contact means supported on the socket and arranged to receive a test lamp and to connect the test lamp terminals with the socket terminals, said contact means being constructed and positioned to permit the simultaneous insertion of a flash lamp and test lamp in the socket, said contact means including two contact members, one of them movable the other being constituted by the socket shell, the movable contact member being constructed and positioned to be engaged by an inserted flash lamp and to be movable into a position disconnected from the test lamp upon insertion of a flash lamp, and spring means coacting with the movable contact member for returning the latter into a position engaging the test lamp upon removal of the flash lamp.

5. A socket for photoflash lamps, the terminals of said socket comprising a spring actuated contact member and a socket shell, said shell having an opening therein for supporting a test lamp and connecting one of the terminals of an inserted test lamp with the shell, in combination with a contact element supported by the spring actuated contact member and positioned to normally engage the second terminal of the test lamp and to be disengaged therefrom upon insertion of a flash lamp into the socket causing a depression of the spring actuated contact member, thereby disconnecting the test lamp when and while a flash lamp is inserted.

6. A socket as described in claim 5, in combination with limit means disposed within the shell and limiting the depth of insertion of a test lamp into the shell.

7. A photoflash arrangement as described in claim 5, wherein the spring actuated contact member comprises a guiding sleeve, a contact pin slidable therein, and a spring within said sleeve biasing the pin to protrude from the sleeve, and wherein said pin supports a contact nose arranged to engage one of the test lamp terminals, said sleeve including an axial slot receiving said nose when the pin is depressed upon insertion of a flash lamp.

8. A photoflash arrangement as described in claim 5, wherein an insulation member is mounted within said shell and constructed to form a shoulder limiting the depth of possible insertion of a test lamp in the shell.

9. A socket for photoflash lamps, the terminals of said socket comprising a spring actuated contact member and a socket shell, said shell having an opening therein for supporting a test lamp and connecting one of the terminals of an inserted test lamp with the shell, in combination with a contact element supported by the spring actuated contact member and positioned to normally engage the second terminal of the test lamp and to be disengaged therefrom upon insertion of a flash lamp into the socket causing a depression of the spring actuated contact member, thereby disconnecting the test lamp when and while the flash lamp is inserted, locking means locking an inserted flash lamp in the shell against the action of the spring actuated contact member, and means for releasing said locking means, thereby providing for an ejection of the flash lamp and the return of the spring actuated member into its test lamp connecting position.

10. A photoflash arrangement including a socket arranged to receive a photoflash lamp and comprising a shell as one terminal and a spring actuated contact member as the second terminal, and circuit means for connecting the socket terminals with a source of current, in combination with a contact element supported by said shell insulated therefrom, a second contact element supported by said spring actuated contact member, said contact elements being constructed and mounted in a relative position causing the contact elements to engage each other when no flash lamp is inserted in the socket and to be disengaged from each other by a depression of said contact member upon insertion of a flash lamp, and circuit means for connecting one of the contact elements to one of the test lamp terminals and the other contact element to the second test lamp terminal.

MORRIS SCHWARTZ.

REFERENCES CITED

The following references are of record in the file of this patent:

UNITED STATES PATENTS

| Number | Name | Date |
| --- | --- | --- |
| 1,303,464 | Davis | May 13, 1919 |
| 2,056,806 | Reno | Oct. 6, 1936 |
| 2,200,458 | Steiner | Mar. 14, 1940 |
| 2,298,403 | Mihalyi | Oct. 13, 1942 |
| 2,329,011 | Steiner | Sept. 7, 1943 |

FOREIGN PATENTS

| Number | Country | Date |
| --- | --- | --- |
| 370,142 | Great Britain | Apr. 7, 1932 |